United States Patent
Ren et al.

(10) Patent No.: US 11,075,783 B2
(45) Date of Patent: Jul. 27, 2021

(54) COMMUNICATION METHOD FOR PHASE SEPARATION DIFFERENTIAL CHAOS SHIFT KEYING BASED ON SECOND ORDER HYBRID SYSTEM

(71) Applicant: Xi'an University of Technology, Shaanxi (CN)

(72) Inventors: Haipeng Ren, Shaanxi (CN); Chao Bai, Shaanxi (CN)

(73) Assignee: Xi'an University of Technology, Shaanxi (CN)

( * ) Notice: Subject to any disclaimer, the term of this patent is extended or adjusted under 35 U.S.C. 154(b) by 0 days.

(21) Appl. No.: 16/636,338

(22) PCT Filed: May 31, 2018

(86) PCT No.: PCT/CN2018/089123
§ 371 (c)(1),
(2) Date: Feb. 4, 2020

(87) PCT Pub. No.: WO2019/153591
PCT Pub. Date: Aug. 15, 2019

(65) Prior Publication Data
US 2020/0366539 A1  Nov. 19, 2020

(30) Foreign Application Priority Data
Feb. 8, 2018 (CN) .......................... 201810126155.8

(51) Int. Cl.
*H04L 27/00* (2006.01)
*H04L 27/36* (2006.01)
*H04L 27/38* (2006.01)

(52) U.S. Cl.
CPC ............ *H04L 27/001* (2013.01); *H04L 27/36* (2013.01); *H04L 27/38* (2013.01)

(58) Field of Classification Search
CPC ........ H04L 27/001; H04L 27/36; H04L 27/38
See application file for complete search history.

(56) References Cited

U.S. PATENT DOCUMENTS

| 6,178,217 B1 * | 1/2001 | Defries | H04B 1/69 375/377 |
| 6,999,445 B1 * | 2/2006 | Dmitriev | H04L 5/02 370/335 |

(Continued)

FOREIGN PATENT DOCUMENTS

| CA | 2995500 A1 * | 6/2017 | .............. H04B 1/69 |
| CN | 101399795 A | 4/2009 | |

(Continued)

OTHER PUBLICATIONS

Chao Bai et al. "Chaos-Based Underwater Communication With Arbitrary Transducers and Bandwidth". applied sciences. Jan. 24, 2018 (Jan. 24, 2018). pp. 1-11.

(Continued)

*Primary Examiner* — Jean B Corrielus
(74) *Attorney, Agent, or Firm* — Gang Yu

(57) ABSTRACT

A communication method for phase separation differential chaos shift keying (DCSK) based on a second order hybrid system (SOHS) is provided. The method includes the following steps. At Step 1: communication system parameters are set. At Step 2: binary information to be transmitted are prepared. At Step 3: the chaotic signal u(t) is generated. At Step 4: the chaotic signal is prepared to be transmitted. At Step 5: a received signal is demodulated. At Step 6: a chaotic matched filtering operation is performed on the demodulated reference signal and the demodulated information bearing signal. At Step 7: optimal signal to noise ratio (SNR) points are extracted in a sampling way. At Step 8: polarity of each symbol is determined to obtain a recovered signal.

4 Claims, 6 Drawing Sheets

(56) References Cited

U.S. PATENT DOCUMENTS

| | | | |
|---|---|---|---|
| 2008/0226072 A1 | 9/2008 | Lee et al. | |
| 2010/0254430 A1* | 10/2010 | Lee | H04L 27/001 375/130 |
| 2011/0019719 A1* | 1/2011 | Michaels | H04J 13/0018 375/142 |
| 2016/0234009 A1* | 8/2016 | Li | H04L 9/0852 |
| 2017/0317712 A1* | 11/2017 | Graceffo | H04B 1/707 |

FOREIGN PATENT DOCUMENTS

| | | | |
|---|---|---|---|
| CN | 101986632 A | 3/2011 | |
| CN | 103580849 A | 2/2014 | |
| CN | 104753638 A | 7/2015 | |
| CN | 105515683 A | 4/2016 | |
| CN | 105915480 A | 8/2016 | |
| CN | 106161310 A | 11/2016 | |
| CN | 107222441 A | 9/2017 | |
| KR | 20110068255 A | 6/2011 | |
| WO | WO-0004685 A1 * | 1/2000 | H04L 27/001 |
| WO | WO-0072541 A1 * | 11/2000 | H04L 27/001 |
| WO | 2016012817 A1 | 1/2016 | |
| WO | 2017107316 A1 | 6/2017 | |

OTHER PUBLICATIONS

Haipeng Ren et al. "A Chaotic Spread Spectrum System for Underwater Acoustic Communication". 2015 IEEE International Wireless Symposium (IWS 2015). Jul. 27, 2015 (Jul. 27, 2015). pp. 1-16.

* cited by examiner

COMMUNICATION METHOD FOR PHASE SEPARATION DIFFERENTIAL CHAOS SHIFT KEYING BASED ON SECOND ORDER HYBRID SYSTEM

CROSS-REFERENCE TO RELATED APPLICATIONS

The present disclosure is a 371 of International Application No. PCT/CN/2018/089123, filed May 31, 2018, which claims priority of Chinese Patent Application No. 201810126155.8, filed to China Patent Office on Feb. 8, 2018. Contents of the present disclosure are hereby incorporated by reference in entirety of the International Application and the Chinese Patent Application.

TECHNICAL FIELD

The present disclosure belongs to the field of spread spectrum communication technology, and in particular to a communication method for phase separation differential chaos shift keying (DCSK) based on a second order hybrid system (SONS).

BACKGROUND

Since autocorrelation of chaotic signals is similar to autocorrelation of pulse signals the chaotic signals have characteristics of favorable anti-multipath and anti-interference abilities, large channel capacity, security performance brought by noise-like, the chaotic signals are widely applied to the digital communication field. At present, communication categories of chaos communication systems include a coherent chaos communication and a non-coherent chaos communication. In the coherent chaos communication, it is necessary that a sending end and a receiving end are synchronic in chaos oscillators, so that the coherent chaos communication cannot be applied to complicated wireless channels, and in particular to multipath channels. However, in the non-coherent chaos communication, the sending end and the receiving end are not required to be synchronic in chaos oscillators and channel estimation is not required to be executed, thus, the non-coherent chaos communication is widely concerned and the non-coherent chaos communication is more adaptable to high-reliability communication under complex channel condition. A typical non-coherent chaos communication, such as DCSK modulation technology, may reduce communication rates due to half of symbol period transmission reference signals. Therefore, researchers pay more attention on how to increase DCSK communication rates, but fail to research how to achieve low bit error rate (BER) in a complex communication channel. Especially, in the premise of compatibility with existing devices, a communication solution, which may achieve aims of high communication rates and low BER, in the complex communication channel (such as underwater communication) has been a technical problem to be solved.

SUMMARY

At least some embodiments of the present disclosure provide a communication method for phase separation differential chaos shift keying (DCSK) based on a second order hybrid system (SONS), so as to at least to partially solve a problem that, in a complex communication channel (such as short-wave communication or underwater communication), a communication solution provided in the related art is hard to achieve aims of high communication rates and low BER and is further hard to compatible with existing devices.

In an embodiment of the present disclosure, the communication method for phase separation DCSK based on the SOHS is provided. The method includes the following steps:

Step 1: Setting communication system parameters; and a bit transmission rate is set as $R_b$ bits/s, a symbol period corresponding to the bit transmission rate is set as $T_b = \Delta t \cdot L$, L is a spreading gain, $L = n_{samp} N_s$, $n_{samp}$ is the number of sampling points during each switching period $T_c$, $N_s$ is the number of switching periods in a modulation of one bit information, $N_s = T_b / T_c$, $\Delta t$ is a sampling interval, $f_c$ is a carrier frequency and $f_c \gg 1/\Delta t$.

Step 2: preparing binary information to be transmitted; and the binary information to be transmitted is preset as $B_n = \{b_1, b_2, \ldots, b_n\}$, $b_k$ represents +1 or −1, k = 1, 2, . . . n represents the kth bit in the binary information to be transmitted and n is the number of bits in the binary information to be transmitted;

Step 3: generating a chaotic signal u(t) and the chaotic signal is generated by a following calculating model of the second order hybrid system:

$$\ddot{u}(t) - 2\beta\dot{u}(t) + (\omega^2 + \beta^2)(u(t) - s) = 0, \quad (1)$$

and t is a continuous time period of the second order hybrid system, $\dot{u}(t)$ and $\ddot{u}(t)$ are respectively first and second derivatives of the chaotic signal u(t), $\omega = 2\pi f$, $\beta = f \ln 2$, f represents is a base frequency of the chaotic signal, $f = 1/(\Delta t \cdot n_{samp})$, s represents a discrete state, when $\dot{u}(t) = 0$, $s(t) = \text{sgn}(u(t))$, otherwise, s(t) keeps unaltered, and sgn(u) is defined as:

$$\text{sgn}(u) = \begin{cases} +1, u \geq 0 \\ -1, u < 0 \end{cases}, \quad (2)$$

and the switching period of the discrete state s is defined as $T_s = 2\pi/\omega = 1/f$;

Step 4: preparing to transmit the chaotic signal;

and for the kth bit in the binary information to be transmitted, a reference signal $R_k(t)$ is calculated by multiplying u(t) by $\sin(2\pi f_c t)$ in a symbol period (k−1)$\Delta tL \leq t < k\Delta tL$, a information bearing signal $I_k(t)$ is calculated by multiplying the chaotic signal u(t) by $\cos(2\pi f_c t)$ to obtain a calculated result and further multiplying this calculated result by a symbol to be transmitted $b_k$ (+1 or −1), the reference signal is added by a modulator to the information bearing signal to obtain the chaotic signal to be transmitted $S_k(t)$ for the bit $b_k$ in the symbol period (k−1)$\Delta tL \leq t < k\Delta tL$:

$$S_k(t) = R_k(t) + I_k(t) = u(t)\sin(2\pi f_c t) + b_k u(t)\cos(2\pi f_c t), (k-1)\Delta tL \leq t < k\Delta tL, \quad (3)$$

and k = 1, 2, . . . , n, and chaotic signals to be transmitted corresponding to the number of n binary symbol bits are obtained;

Step 5: demodulating a received signal;

and the received signal $v_k(t)$ transmitted through a communication channel and obtained by a receiving end, is respectively multiplied by synchronized orthogonal carriers $\sin(2\pi f_c t)$ and $\cos(2\pi f_c t)$ to obtain a demodulated reference signal $v_{1k}(t)$ and a demodulated information bearing signal $v_{2k}(t)$ by the following formulas:

$$v_{1k}(t) = v_k(t)\sin(2\pi f_c t) = (S_k(t) * h(t))\sin(2\pi f_c t) \Delta t(k-1)L \leq t < \Delta tkL$$

$$v_{2k}(t) = v_k(t)\cos(2\pi f_c t) = (S_k(t) * h(t))\cos(2\pi f_c t) \Delta t(k-1)L \leq t < \Delta tkL,$$

and h(t) is a impulse response of the communication channel, and a sign "*" is defined as a convolution operation;

Step 6: performing a chaotic matched filtering operation on the demodulated reference signal and the demodulated information bearing signal;

and the demodulated reference signal $v_{1k}(t)$ and the demodulated information bearing signal $v_{2k}(t)$ are inputted into a matched filter, which is configured to perform the chaotic matched filtering operation on the demodulated reference signal and the demodulated information bearing signal, to obtain a matched filtering output signal $x_{1k}(t)$ corresponding to the demodulated reference signal and a matched filtering output signal $x_{2k}(t)$ corresponding to the demodulated information bearing signal in the symbol period $(k-1)\Delta tL \leq t < k\Delta tL$, and each matched filtering output signal is expressed by the following formula:

$$x(t) = \int_{-\infty}^{+\infty} v(\tau) g(t-\tau) d\tau, \quad (4)$$

and x(t) is a matched filtering output signal, v(τ) is an input signal of the matched filter, r represent an integral variable, g(t−τ) is a time delay r of a signal g(t), a right side of the formula (4) is a convolution operation between the input signal v(τ) and a basis function g(t), and the basis function is expressed by the following formula:

$$g(t) = \begin{cases} \left(1 - e^{-\frac{\beta}{f}}\right) e^{-\beta t} \left(\cos(-\omega t) - \frac{\beta}{\omega} \sin(-\omega t)\right), & t \geq 0 \\ 1 - e^{\beta\left(-t - \frac{1}{f}\right)} \left(\cos(-\omega t) - \frac{\beta}{\omega} \sin(-\omega t)\right), & -\frac{1}{f} \leq t < 0 \ ; \\ 0, & t < -\frac{1}{f} \end{cases} \quad (5)$$

Step 7: extracting optimal signal to noise ratio (SNR) points in a sampling way;

and the matched filtering output signal $x_{1k}(t)$ and the matched filtering output signal $x_{2k}(t)$ respectively includes: $N_s$ optimal SNR points, the matched filtering output signal $x_{1k}(t)$ and the matched filtering output signal $x_{2k}(t)$ are sampled according to a period of $T_b/N_s$ through the following formula:

$$\begin{cases} z_{1k}(i) = x_{1k}\left((k-1)T_b + \frac{T_b}{N_s}(i-1) + \frac{n_{samp}}{2} \Delta t\right) & 1 \leq i \leq N_s \\ z_{2k}(i) = x_{2k}\left((k-1)T_b + \frac{T_b}{N_s}(i-1) + \frac{n_{samp}}{2} \Delta t\right) & 1 \leq i \leq N_s \end{cases}, \quad (6)$$

and i is a positive integer, $z_{1k}(i)$ and $z_{2k}(i)$ are sampling sequences of the optimal SNR points after performing the chaotic matched filtering operation on the demodulated reference signal and the demodulated information bearing signal, i=1, ..., $N_s$;

Step 8: determining polarity of each symbol to obtain a recovered signal;

and for the kth information bit, a discrete correlation is performed on $z_{1k}(i)$ and $z_{2k}(i)$ to obtain $z_k$, and the discrete correlation is calculated by the following formula:

$$Z_k = \sum_{i=1}^{N_t} z_{1k}(i) z_{2k}(i), \quad (7)$$

and the kth information bit is recovered according to the calculated result $z_k$ through the following formula to obtain the recovered signal:

$$\tilde{b}_k = \begin{cases} +1 & Z_k > 0 \\ -1 & Z_k \leq 0 \end{cases}, \quad (8)$$

and communication is completed.

Beneficial effects of at least some embodiments of the present disdosure include the following aspects.

At one, the method provided in the present disclosure can be implemented without performing technical solutions including chaotic synchronization, channel estimation and complexity balancing adopted in the traditional wireless communication, and compared with the existing DCSK solution, the method provided in the present disclosure can be feasibility applied to actual communication devices without using accurate delay and switch components.

At two, the method provided in the present disclosure can modulate the reference signal and the information bearing signal by an orthogonal signal, and compared with the existing DCSK solution, the method provided in the present disclosure can achieve higher communication rates and bandwidth efficiency.

At three, the method provided in the present disclosure can transfer spectrum of chaotic signals close to a center frequency of a carrier signal, can be effectively compatible with existing communication devices, can be applied to a complex narrow-band communication channel (such as short-wave communication or underwater communication), and compared with the existing DCSK solution, the method provided in the present disclosure can achieve higher communication rates and lower BER without increasing complexities of communication devices.

At four, the chaotic matched filter provided in the present disclosure effectively reduces noise effect. At the same time, the operation of sampling the optimal SNR points further reduces noise effect. And under the condition of lower SNR, the demodulation operation can be effectively performed, so as to improve the reliability of the communication devices.

DETAILED DESCRIPTION

Exemplary embodiments of the present disclosure will be described in detail in conjunction with the accompanying drawings to explain the present disclosure.

Figure 1:
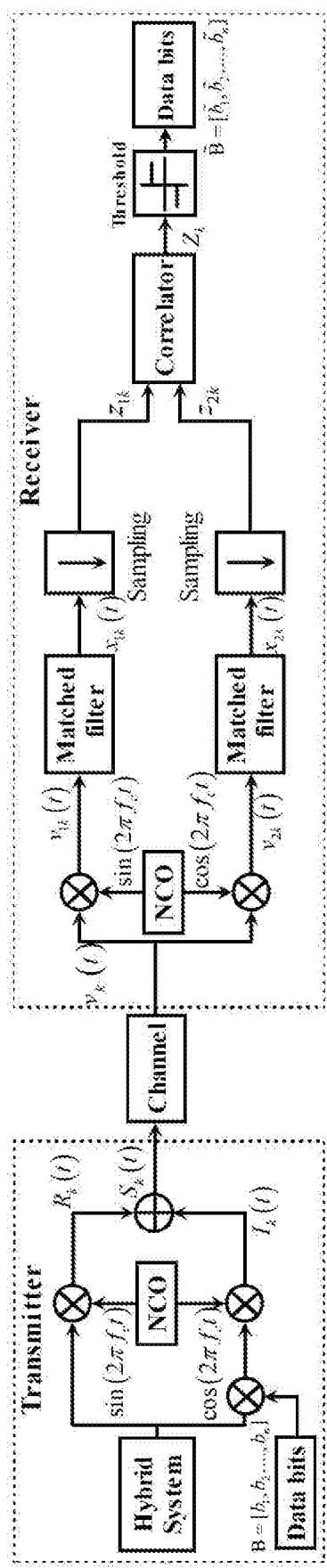
FIG. 1 shows a structural block diagram of a communication system of SOHS-DCSK according to an embodiment of the present disclosure.

As shown in FIG. 1, a working principle of the communication system is as follows. A modulated signal in a symbol period is acquired by calculating a sum of mutual orthogonal signals including a reference signal and an information bearing signal. And a chaotic signal u(t) generated in the symbol period is multiplied with a carrier signal $\sin(2\pi f_c t)$ to obtain the reference signal. The chaotic signal u(t) is further multiplied with a carrier signal $\cos(2\pi f_c t)$ to obtain a calculated result, and then this calculated result is multiplied with a binary symbol $b_k$, namely an information bit of a digital signal $B_n=\{b_1,b_2,\ldots,b_n\}$ to obtain the information bearing signal. The reference signal $u(t)\sin(2\pi f_c t)$ is added to the information bearing signal $b_k u(t)\cos(2\pi f_c t)$ to obtain a modulated signal $S_k(t)$, $k=1,2,\ldots,n$ including binary symbol $b_k$, so that modulated signals corresponding to n binary symbols are obtained. The modulated signal $S_k(t)$ is transmitted through a communication channel to a receiving end, and the receiving end obtains a received signal $v_k(t)$. This received signal is respectively multiplied with synchronized orthogonal carrier $\sin(2\pi f_c t)$ to obtain a demodulated reference signal $v_{1k}(t)$ and a demodulated information bearing signal $v_{2k}(t)$. The demodulated reference signal $v_{1k}(t)$ and the demodulated information bearing signal $v_{2k}(t)$ are inputted into a chaotic matched filter to perform filtering operation to obtain signals $x_{1k}(t)$ and $x_{2k}(t)$ outputted by the chaotic matched filter. The signals $x_{1k}(t)$ and $x_{2k}(t)$ are sampled according to a period of $T_b/N_s$ to obtain sampling sequences and $z_{2k}$. A discrete correlation operation is performed on the sampling sequences to output a processed result. When a threshold for obtaining a recovered signal is signal, the kth information bit of the processed result is recovered to obtain the recovered signal, $k=1,2,\ldots,n$, so as to complete the transmission of n binary symbols.

Based on the principle mentioned above, the method provided in the present disclosure is implemented by the following steps.

Step 1: Setting communication system parameters; and a bit transmission rate is set as $R_b$ bits/s, a symbol period corresponding to the bit transmission rate is set as $T_b=\Delta t \cdot L$, L is a spreading gain, $L=n_{samp}N_s$, $n_{samp}$ is the number of sampling points during each switching period $T_c$, $N_s$ is the number of switching periods in a modulation of one bit information, $N_s=T_b/T_c$, $\Delta t$ is a sampling interval, $f_c$ is a carrier frequency and $f_c \gg 1/\Delta t$.

In an optional embodiment, the bit transmission rate $R_b=1$ bit/s, the symbol period $T_b=1$ s, the spreading gain $L=256$, $n_{samp}=64$, $T_c=0.25$ s, $N_s=4$, and $f_c=10000$ Hz.

Step 2: preparing binary information to be transmitted;
and the binary information to be transmitted is preset as $B_n=\{b_1, b_2, \ldots b_n\}$, $b_k$ represents +1 or −1, k=1, n represents the kth bit in the binary information to be transmitted and n is the number of bits in the binary information to be transmitted.

Figure 2:
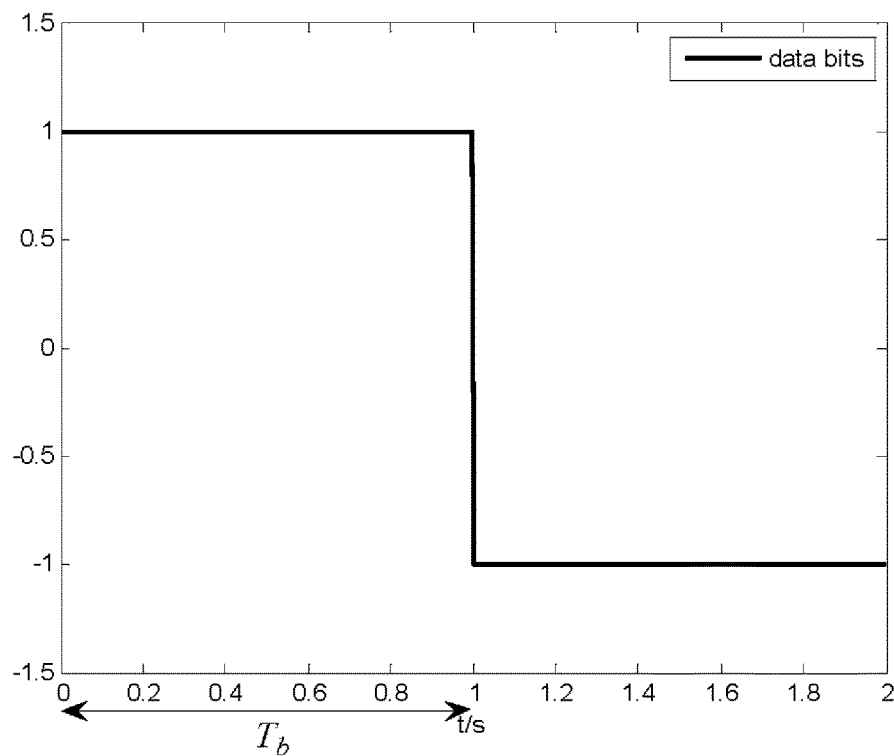
FIG. 2 shows a schematic diagram of binary information to be transmitted, '+1' during [0, 1]s, and '−1' during [1,2]s according to an optional embodiment of the present disclosure.

In an optional embodiment, two symbols are transmitted and $B_n=\{+1, -1\}$. As shown in FIG. 2, symbols '+1' and '−1' are continued for a symbol period, namely 1s.

Step 3: generating a chaotic signal u(t)
and the chaotic signal is generated by a following calculating model of the second order hybrid system:

$$\ddot{u}(t)-2\beta\dot{u}(t)+(\omega^2+\beta^2)(u(t)-s)=0, \quad (1)$$

and t is a continuous time period of the second order hybrid system, $\dot{u}(t)$ and $\ddot{u}(t)$ are respectively first and second derivatives of the chaotic signal u(t), $\omega=2\pi f$, $\beta f \ln 2$, f represents is a base frequency of the chaotic signal, $f=1/(\Delta t \cdot n_{samp})$, s represents a discrete state, when $\dot{u}(t)=0$, $s(t)=\text{sgn}(u(t))$, otherwise, s(t) keeps unaltered, and sgn(u) is defined as:

$$\text{sgn}(u) = \begin{cases} +1, u \geq 0 \\ -1, u < 0 \end{cases}, \quad (2)$$

and the switching period of the discrete state s is defined as $T_s=2\pi/\omega=1/f$.

Figure 3:
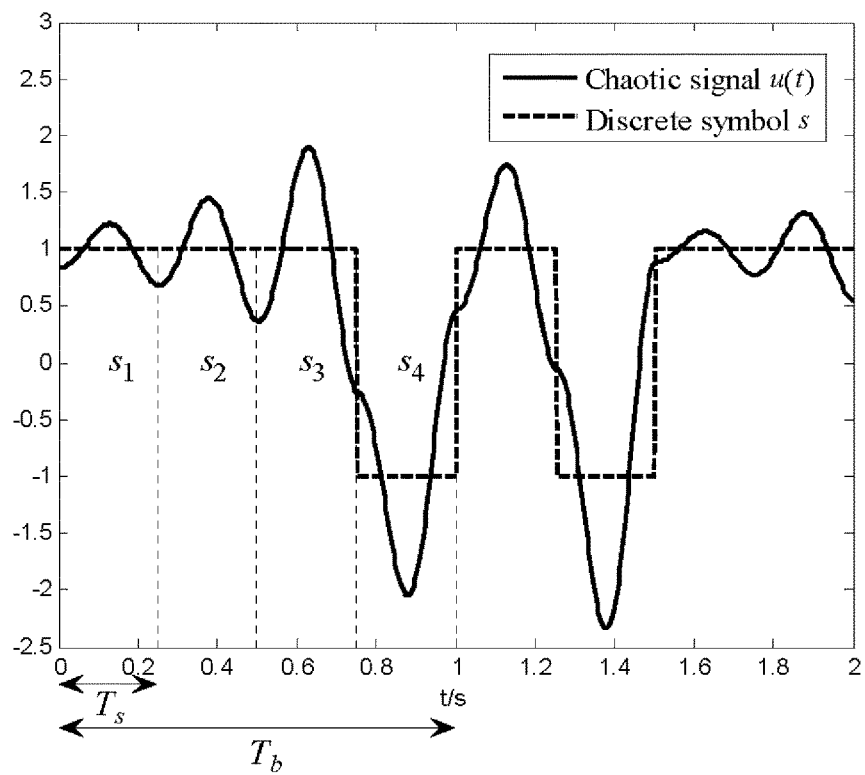
FIG. 3 shows a schematic diagram of generating a chaotic signal and a discrete symbol corresponding to the chaotic signal in a chaotic system according to an optional embodiment of the present disclosure.

In an optional embodiment, the chaotic signal generated according to parameters set at Step 1, a solid line represents a continuous chaotic signal, an initial value of u(t) is 0.842, and a dashed line represents discrete symbols embedded in the chaotic signal. Since $f=1/(\Delta t \cdot n_{samp})=1/(T_b/L \cdot n_{samp})=4$ Hz, four discrete symbols are generated in is as shown in FIG. 3.

Step 4: preparing to transmit the chaotic signal;
and for the kth bit in the binary information to be transmitted, a reference signal $R_k(t)$ is calculated by multiplying u(t) by $\sin(2\pi f_c t)$ in a symbol period $(k−1)\Delta tL \leq t < k\Delta tL$, a information bearing signal $I_k(t)$ is calculated by multiplying the chaotic signal u(t) by $\cos(2\pi f_c t)$ to obtain a calculated result and further multiplying this calculated result by a symbol to be transmitted $b_k$ (+1 or −1), the reference signal is added by a modulator to the information bearing signal to obtain the chaotic signal to be transmitted $S_k(t)$ for the bit $b_k$ in the symbol period $(k−1)\Delta tL \leq t < k\Delta tL$:

$$S_k(t)=R_k(t)+I_k(t)=u(t)\sin(2\pi f_c t)+b_k u(t)\cos(2\pi f_c t), (k−1)\Delta tL \leq t < k\Delta tL, \quad (3)$$

and $k=1,2,\ldots,n$, and chaotic signals to be transmitted corresponding to the number of n binary symbol bits are obtained.

In an optional embodiment, for the 1th bit "+1" in the binary information to be transmitted, $u(t)\sin(2\pi f_c t)$ set as the modulated reference signal is transmitted in a symbol period of [0,1)s, and $u(t)\cos(2\pi f_c t)$ is multiplied with binary information "+1" to determine the modulated information bearing signal, so as to obtain a modulated signal of the 1th bit "+1" in the binary information as follows: $S_1(t)=u(t)\sin(2\pi f_c t)+u(t)\cos(2\pi f_c t)$, $t\in[0,1)$s. Similarly, for the 2th bit "−1" in the binary information to be transmitted, $u(t)\sin(2\pi f_c t)$ set as the modulated reference signal is transmitted in a symbol period of [1,2)s, and $u(t)\cos(2\pi f_c t)$ is multiplied with binary information "−1" to determine the modulated information bearing signal, so as to obtain a final modulated signal of the 2th bit "−1" in the binary information as follows: $S_2(t)=u(t)\sin(2\pi f_c t)-u(t)\cos(2\pi f_c t)$, $t\in[1,2)$s.

Figure 4:
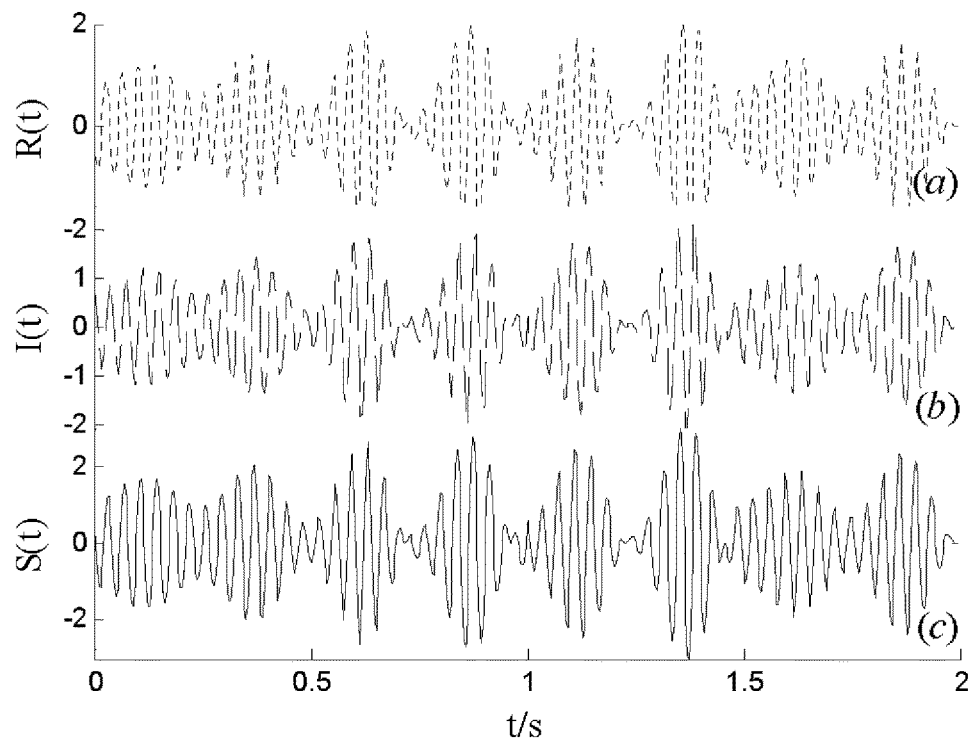
FIG. 4 shows a schematic diagram of modulating a transmitted signal according to an optional embodiment of the present disclosure.

As shown in FIG. 4, the dashed line represents the modulated reference signal, the fold line represents the the modulated information bearing signal, and the solid line represents the final modulated signal.

Step 5: demodulating a received signal;

and the received signal $v_k(t)$ transmitted through a communication channel and obtained by a receiving end, is respectively multiplied by synchronized orthogonal carriers $\sin(2\pi f_c t)$ and $\cos(2\pi f_c t)$ to obtain a demodulated reference signal $v_{1k}(t)$ and a demodulated information bearing signal $v_{2k}(t)$ by the following formulas:

$$v_{1k}(t)=v_k(t)\sin(2\pi f_c t)=(S_k(t)*h(t))\sin(2\pi f_c t)\ \Delta t(k-1)$$
$$L\le t<\Delta tkL$$

$$v_{2k}(t)=v_k(t)\cos(2\pi f_c t)=(S_k(t)*h(t))\cos(2\pi f_c t)\ \Delta t(k-1)$$
$$L\le t<\Delta tkL,$$

and h(t) is a impulse response of the communication channel, and a sign "*" is defined as a convolution operation.

In an optional embodiment, the communication channel may be a underwater acoustic channel model. The received signal $v_k(t)$ transmitted through the communication channel is influenced by multiple factors, such as noise, multipath transmission, attenuation and the like.

Figure 5:
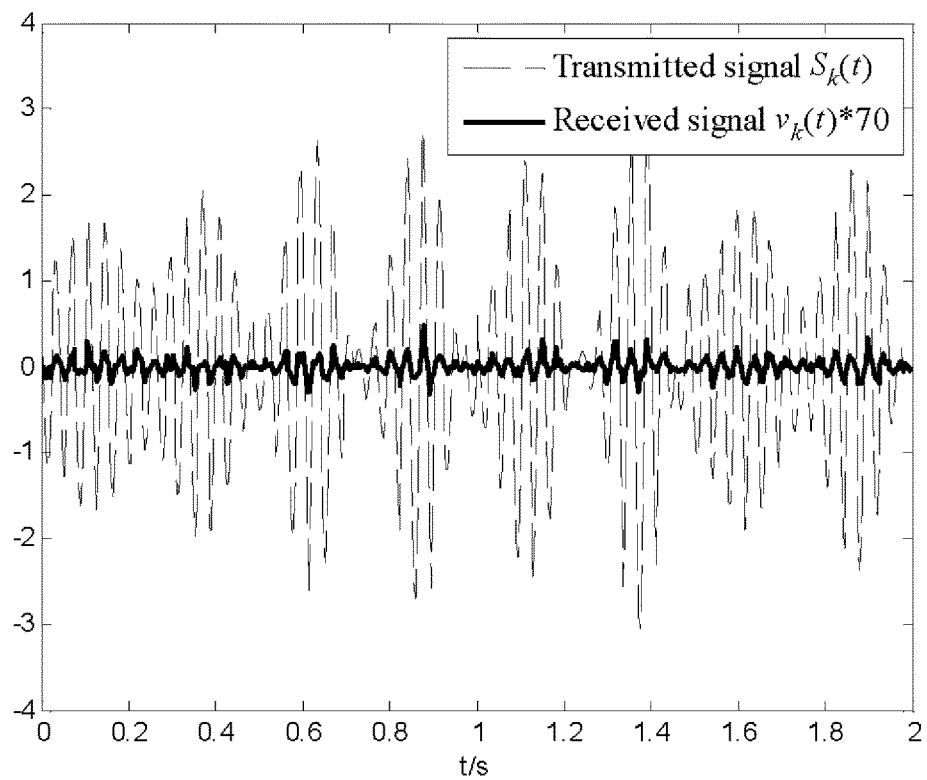
FIG. 5 shows a schematic diagram of a received signal transmitted through a communication channel according to an optional embodiment of the present disclosure.
Figure 6:
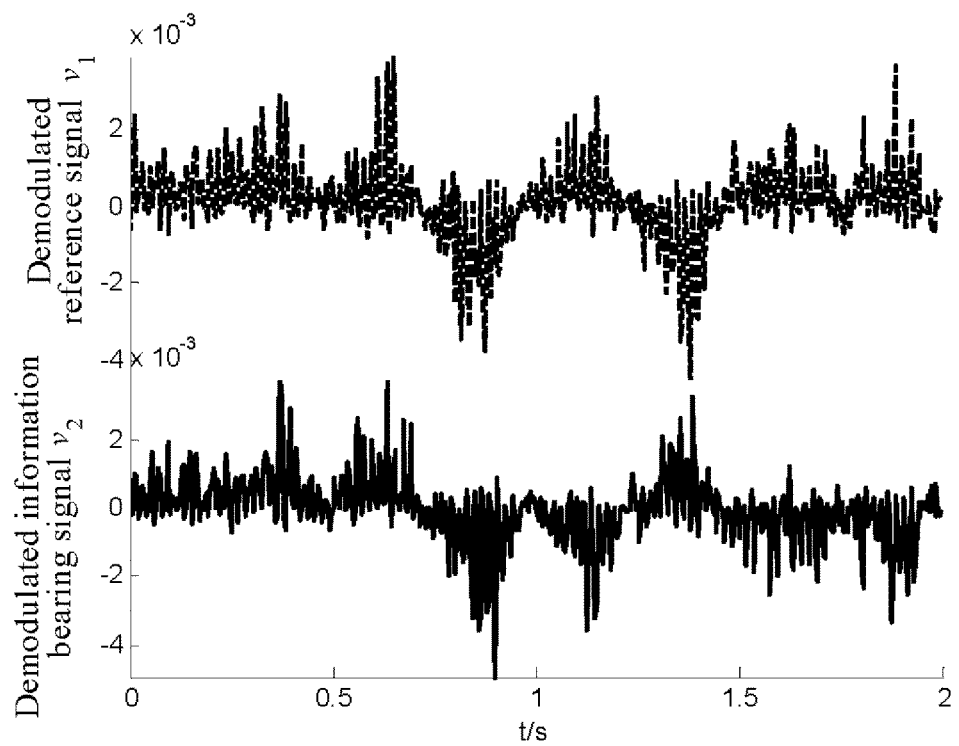
FIG. 6 shows a schematic diagram of demodulating a reference signal and an information bearing signal according to an optional embodiment of the present disclosure.

The received signal received by the receiving end distorts seriously. As shown in FIG. 5, the dashed line represents the transmitted signal, and the solid line represents the received signal $v_k(t)$ magnified 70 times. As shown in FIG. 6, the received signal $v_k(t)$ is respectively multiplied by $\sin(2\pi f_c t)$ and $\cos(2\pi f_c t)$ to obtain the demodulated reference signal $v_{1k}(t)$ and the demodulated information bearing signal $v_{2k}(t)$. And the dashed line represents the demodulated reference signal, and the solid line represents the demodulated information bearing signal.

Step 6: performing a chaotic matched filtering operation on the demodulated reference signal and the demodulated information bearing signal;

and the demodulated reference signal $v_{1k}(t)$ and the demodulated information bearing signal $v_{2k}(t)$ are inputted into a matched filter, which is configured to perform the chaotic matched filtering operation on the demodulated reference signal and the demodulated information bearing signal, to obtain a matched filtering output signal $x_{1k}(t)$ corresponding to the demodulated reference signal and a matched filtering output signal $x_{2k}(t)$ corresponding to the demodulated information bearing signal in the symbol period $(k-1)\Delta tL \le t < k\Delta tL$, and each matched filtering output signal is expressed by the following formula:

$$x(t)=\int_{-\infty}^{+\infty}v(\tau)g(t-\tau)d\tau, \quad (4)$$

and x(t) is a matched filtering output signal, v(T) is an i input signal of the matched filter, τ represent an integral variable, g(t−τ) is a time delay τ of a signal g(t), a right side of the formula (4) is a convolution operation between the input signal v(τ) and a basis function g(t), and the basis function is expressed by the following formula:

$$g(t)=\begin{cases}\left(1-e^{-\frac{\beta}{f}}\right)e^{-\beta t}\left(\cos(-\omega t)-\frac{\beta}{\omega}\sin(-\omega t)\right), & t\ge 0\\ 1-e^{\beta\left(-t-\frac{1}{f}\right)}\left(\cos(-\omega t)-\frac{\beta}{\omega}\sin(-\omega t)\right), & -\frac{1}{f}\le t<0\\ 0, & t<-\frac{1}{f}\end{cases} \quad (5)$$

Figure 7:
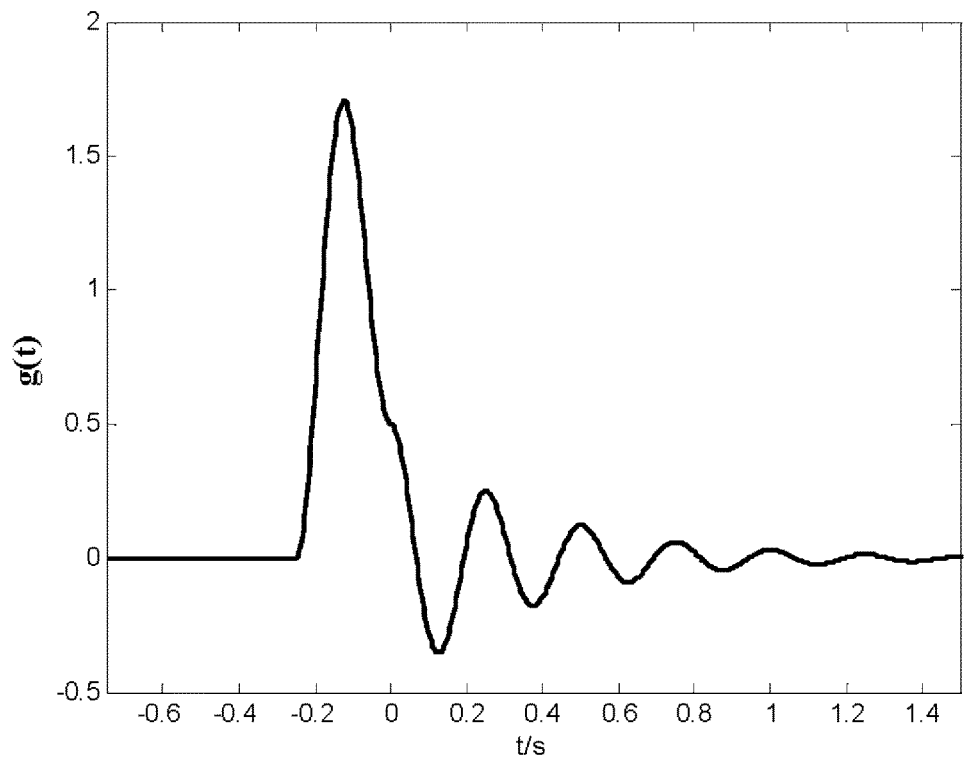
FIG. 7 shows a schematic diagram of a chaotic basis function according to an optional embodiment of the present disclosure.
Figure 8:
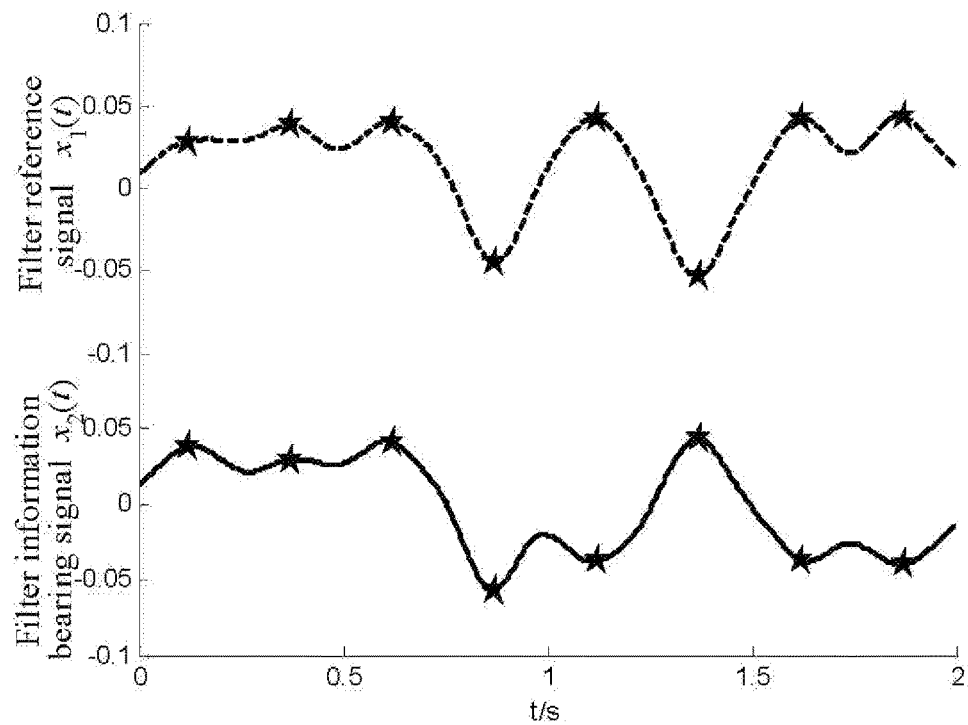
FIG. 8 shows a schematic diagram of outputting signals and optimal SNR points by a chaotic matched filter according to an optional embodiment of the present disclosure.

In an optional embodiment, the basis function g(t) configured in the chaotic matched filter is as shown in FIG. 7. $v_{1k}(t)$ and $v_{2k}(t)$ at Step 5 are inputted to the chaotic matched filter to output signals $x_{1k}(t)$ and $x_{2k}(t)$ as shown in FIG. 8. And the dashed line represents the matched filter signal $x_{1k}(t)$, and the solid line represents the matched filter signal $x_{2k}(t)$. It can be seen that the chaotic matched filter can effectively reduce noise influence.

Step 7: extracting optimal signal to noise ratio (SNR) points in a sampling way;

and the matched filtering output signal $x_{1k}(t)$ and the matched filtering output signal $x_{2k}(t)$ respectively includes: $N_s$ optimal SNR points, the matched filtering output signal $x_{1k}(t)$ and the matched filtering output signal $x_{2k}(t)$ are sampled according to a period of $T_b/N_s$ through the following formula:

$$\begin{cases}z_{1k}(i)=x_{1k}\left((k-1)T_b+\frac{T_b}{N_s}(i-1)+\frac{n_{samp}}{2}\Delta t\right) & 1\le i\le N_s\\ z_{2k}(i)=x_{2k}\left((k-1)T_b+\frac{T_b}{N_s}(i-1)+\frac{n_{samp}}{2}\Delta t\right) & 1\le i\le N_s\end{cases} \quad (6)$$

and i is a positive integer, $z_{1k}(i)$ and $z_{2k}(i)$ are sampling sequences of the optimal SNR points after performing the chaotic matched filtering operation on the demodulated reference signal and the demodulated information bearing signal, $i=1, \ldots, N_s$.

In an optional embodiment, the sampling operation is performed, according to the formula (6), on the matched filter signals to obtain the optimal SNR points. For the 1th symbol period [0,1)s, sampled time points include 0.125 s, 0.375 s, 0.625 s, 0.875 s. For the 2th symbol period [1,2)s, sampled time points include 1.125 s, 1.375 s, 1.625 s, 1.875 s, as shown in five-pointed star of FIG. 8.

For the 1th symbol period [0,1)s, the optimal SNR points include:

$z_{11}$=[0.0329, 0.0403, 0.0328, −0.0546],
$z_{21}$=[0.0331, 0.0365, 0.0326, −0.0594];

For the 2th symbol period [1,2)s, the optimal SNR points include:

$z_{12}$=[0.0481, −0.0439, 0.0422, 0.0503],
$z_{22}$=[−0.0287, 0.0533, −0.0396, −0.0463].

Step 8: determining polarity of each symbol to obtain a recovered signal;

and for the kth information bit, a discrete correlation is performed on $z_{1k}(i)$ and $z_{2k}(i)$ to obtain $z_k$, and the discrete correlation is calculated by the following formula:

$$Z_k=\sum_{i=1}^{N_t} z_{1k}(i)z_{2k}(i), \quad (7)$$

and the kth information bit is recovered according to the calculated result $z_k$ through the following formula to obtain the recovered signal:

$$\tilde{b}_k=\begin{cases}+1 & Z_k>0\\ -1 & Z_k\le 0\end{cases}, \quad (8)$$

and communication is completed.

In an optional embodiment, according to formulas (7) and (8), for the 1th symbol, when $Z_1$=0.0069>0, $\tilde{b}_1$=+1, and for the 2th symbol, when $Z_2=-0.0077<0$, $\tilde{b}_2=-1$. Finally, the recovered signal can be represented as $\tilde{B}_2=\{+1, -1\}$.

In an optional embodiment, simulation verification for AWGN channel BER is performed.

Figure 9:
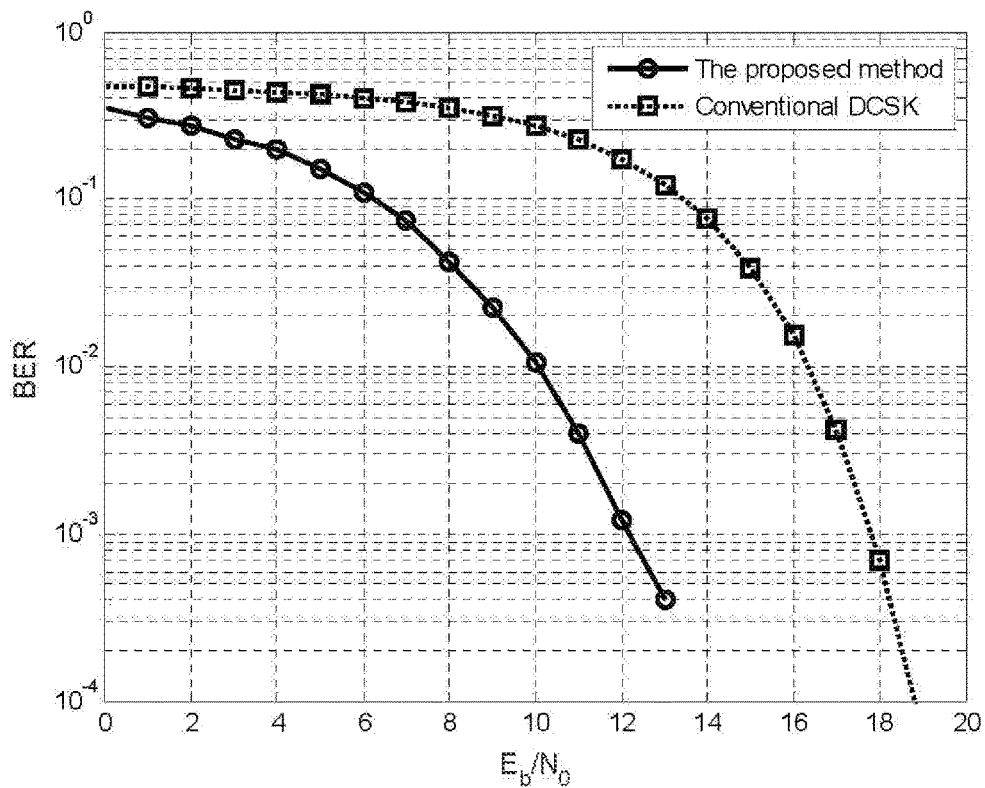
FIG. 9 shows a schematic diagram of a BER over an additive white gaussian noise (AWGN) channel according to an optional embodiment of the present disclosure.

Compared with a logistic mapping adopted in the traditional DCSK solution, in at least some embodiments of the present disclosure, the chaotic signals and the chaotic matched filter corresponding to the chaotic signals generated by the chaotic system effectively restrains noise interference. At the same time, the sampling process of the optimal SNR points further can reduce noise influence and acquire lower BER. In this simulation verification, L=256, $n_{samp}=64$, $N_s=4$, $f_c=1800$ Hz and a sampling frequency of a digital analog convertor $f_s=96000$ Hz, which is different from generating the chaotic signals through the logistic mapping in the traditional DCSK solution. A simulated result is as shown in FIG. 9, and compared with the traditional DCSK solution, the BER performance improves about 6 dB and doubled communication rate can be achieved. Especially, under the condition of lower SNR, the favorable BER performance can be further achieved.

In another optional embodiment, simulation verification for the multipath attenuation channel is performed.

Figure 10:
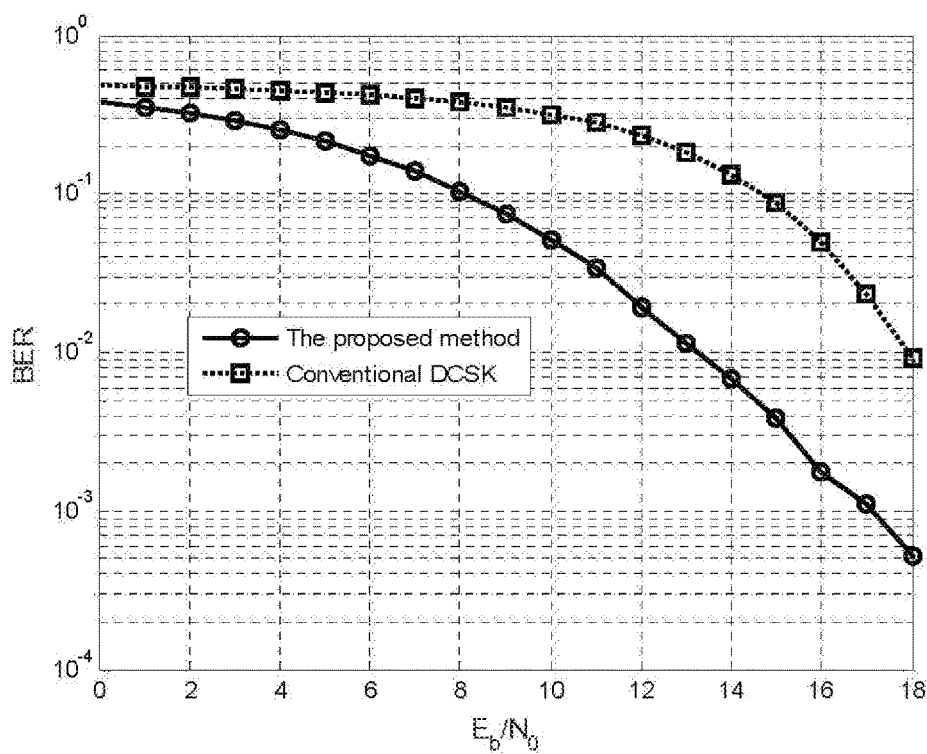
FIG. 10 shows a schematic diagram of a BER performance over a multipath attenuation channel according to an optional embodiment of the present disclosure.

Compared with the AWGN channel, the environment of the multipath attenuation channel is more complex, so that higher requirements are put forward on the reliability of communication devices. In this simulation verification, a multipath channel model is adopted and the configuration of communication parameters for the multipath attenuation channel is the same as the configuration of communication parameters for the AWGN channel. The channel delay is [0, 0.0042, 0.0096]s, and the attenuation intensity is [0-3-6] dB. As shown in FIG. 10, the DCSK solution provided in the present disclosure is compared with the traditional DCSK solution, and it can be seen that under the condition of higher SNR, the traditional DCSK solution cannot achieve lower BER. However, the DCSK solution provided in the present disclosure can not only achieve lower BER, but also ensure the reliability of communication devices in the complex channel.

Figure 11:
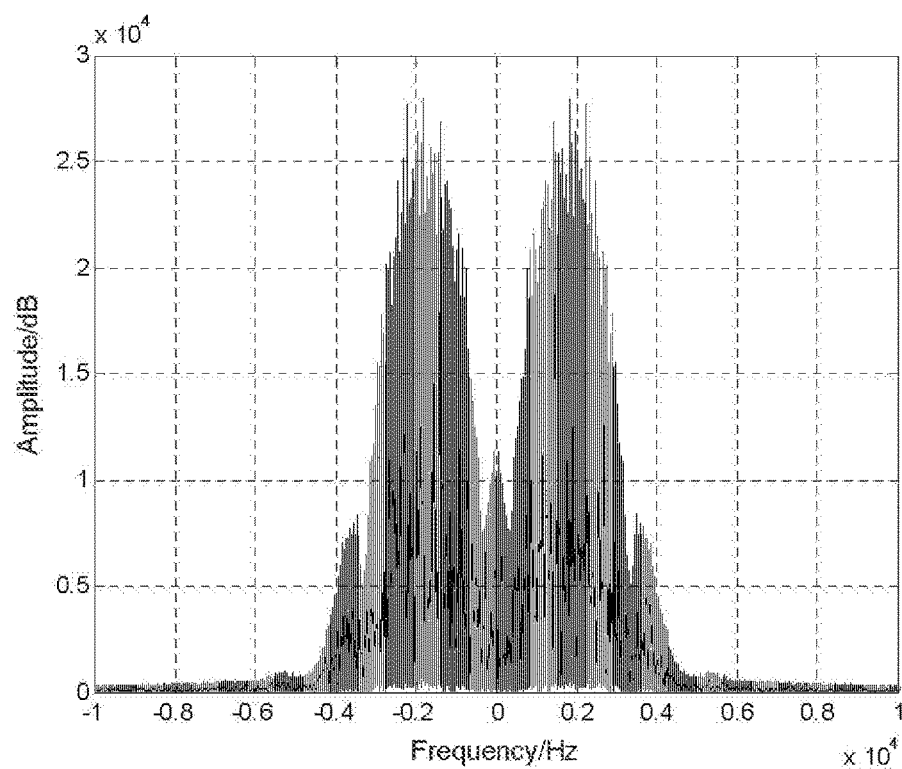
FIG. 11 shows a schematic diagram of a spectrum of a modulated signal according to an optional embodiment of the present disclosure.

A spectrum of the modulated signal is shown in FIG. 11, and it can be seen that the method provided in the present disclosure can transfer spectrum of modulated signals close to a center frequency of a carrier signal, so as to be effectively compatible with existing communication devices.

To sum up, the special chaotic system and the chaotic matched filter corresponding to the special chaotic system provided in at least some embodiments of the present disclosure can modulate reference signals and information bearing signals to transmit on the same symbol period through the orthogonal signals. Compared with the traditional DCSK solution, the method provided in the present disclosure can not only achieve doubled communication rate, but also acquire lower BER. Furthermore, the method provided in the present disclosure can transfer spectrum of modulated signals close to a carrier center frequency through orthogonal carrier signals, so as to be effectively compatible with existing communication devices.

What is claimed is:

1. A communication method for phase separation differential chaos shift keying (DCSK) based on a second order hybrid system (SOHS), comprising the following steps:
step 1: setting communication system parameters;
wherein a bit transmission rate is set as $R_b$ bits/s, a symbol period corresponding to the bit transmission rate is set as $T_b=\Delta t \cdot L$, L is a spreading gain, $L=n_{samp}N_s$, $n_{sanp}$ is the number of sampling points during each switching period $T_c$, $N_s$ is the number of switching periods in a modulation of one binary information, $N_s=T_b/T_c$, $\Delta t$ is a sampling interval, $f_c$ is a carrier frequency and $f_c \gg 1/\Delta f$,
step 2: preparing binary information to be transmitted;
wherein the binary information to be transmitted is preset as $B_n=b_1, b_2, \ldots, b_n$, $b_k$ represents +1 or −1, k= 1, 2, . . . , n represents the kth bit in the binary information to be transmitted and n is the number of bits in the binary information to be transmitted;
step 3: generating a chaotic signal u(t)
wherein the chaotic signal u(t) is generated by calculating a model of the second order hybrid system as follows:

$$\ddot{u}(t)-2\beta\dot{u}(t)+(\omega^2+\beta^2)(u(t)-s)=0, \quad (1)$$

and t a continuous time period of the second order hybrid system, $\dot{u}(t)$ and $\ddot{u}(t)$ are respectively first and second derivatives of the chaotic signal u(t), $\omega=2\pi f$, $\beta=f\ln 2$, "f" represents is a base frequency of the chaotic signal u(t), $f=1/(\Delta t \cdot n_{samp})$, "s" represents a discrete state, when $\dot{u}(t)=0$, $s(t)=\text{sgn}(u(t))$, otherwise, s(t) keeps unaltered, and sgn(u) is defined as:

$$\text{sgn}(u) = \begin{cases} +1, u \geq 0 \\ -1, u < 0 \end{cases}, \quad (2)$$

and the switching period of the discrete state s is defined as $T_s=2\pi/\omega=1/f$;
step 4: preparing to transmit the generated, chaotic signal;
wherein for the kth bit in the binary information to be transmitted, a reference signal $R_k(t)$ is calculated by multiplying u(t) by $\sin(2\pi f_c t)$ in a symbol period $(k-1)\Delta tL \leq t < k\Delta tL$, an information bearing signal $I_k(t)$ is calculated by multiplying the chaotic signal u(t) by $\cos(2\pi f_c t)$ to obtain a calculated result and further multiplying this calculated result by a symbol to be transmitted $b_k$, the reference signaler $R_k(t)$ is added by a modulator to the information bearing signal $I_k(t)$ to obtain the generated chaotic signal to be transmitted signal $S_k(t)$ for the bit $b_k$ in the symbol period $(k-1)\Delta tL \leq t < k\Delta tL$:

$$S_k(t)=R_k(t)+I_k(t)=u(t)\sin(2\pi f_c t)+b_k u(t)\cos(2\pi f_c t), (k-1)\Delta tL \leq t < k\Delta tL, \quad (3)$$

wherein k=1,2,n, and chaotic signals to be transmitted corresponding to the number of n binary symbol bits are obtained;
step 5: demodulating a received signal $v_k(t)$;
wherein the received signal $v_k(t)$ transmitted through a communication channel and obtained by a receiving end, is respectively multiplied by synchronized orthogonal carriers $\sin(2\pi f_c t)$ and $\cos(2\pi f_c t)$ to obtain a demodulated reference signal $v_{1k}(t)$ and a demodulated information bearing signal $v_{2k}(t)$ by the following formulas:

$$v_{1k}(t)=v_k(t)\sin(2\pi f_c t)=(S_k(t)*h(t))\sin(2\pi f_c t) \; \Delta t(k-1)L \leq t < \Delta tkL$$

$$v_{2k}(t)=v_k(t)\cos(2\pi f_c t)=(S_k(t)*h(t))\cos(2\pi f_c t) \; \Delta t(k-1)L \leq t < \Delta tkL,$$

wherein h(t) is an impulse response of the communication channel, and a sign "*" is defined as a convolution operation;

step 6: performing a chaotic matched filtering operation on the demodulated reference signal $v_{1k}(t)$ and the demodulated information bearing signal $v_{2k}(t)$;

wherein the demodulated reference signal $v_{1k}(t)$ and the demodulated information bearing signal $v_{2k}(t)$ are inputted into a matched filter, which is configured to perform the chaotic matched filtering operation on the demodulated reference signal and the demodulated information bearing signal, to obtain a matched filtering output signal $x_{1k}(t)$ corresponding to the demodulated reference signal and a matched filtering output signal $x_{2k}(t)$ corresponding to the demodulated information bearing signal in the symbol period $(k-1)\Delta tL \le t < k\Delta tL$, and each matched filtering output signal is expressed by the following formula:

$$x(t) = \int_{-\infty}^{+\infty} v(\tau) g(t-\tau) d\tau, \tag{4}$$

wherein $x(t)$ is a matched filtering output signal, $v(\tau)$ is an input signal of the matched filter, $\tau$ represent an integral variable, $g(t-\tau)$ is a time delay $\tau$ of a signal, a right side of the formula (4) is a convolution operation between the input signal $v(\tau)$ and a basis function $g(t)$, and the basis function is expressed by the following formula:

$$g(t) = \begin{cases} (1 - e^{-\frac{\beta}{f}}) e^{-\beta t} \left( \cos(-\omega t) - \frac{\beta}{\omega} \sin(-\omega t) \right), & t \ge 0 \\ 1 - e^{\beta(-t-\frac{1}{f})} \left( \cos(-\omega t) - \frac{\beta}{\omega} \sin(-\omega t) \right), & -\frac{1}{f} \le t < 0 \; ; \\ 0, & t < -\frac{1}{f} \end{cases} \tag{5}$$

step 7: extracting optimal signal to noise ratio (SNR) points in a sampling;

wherein the matched filtering output signal $x_{1k}(t)$ and the matched filtering output signal $x_{2k}(t)$ respectively comprises: $N_s$ optimal SNR points, the matched filtering output signal $x_{1k}(t)$ and the matched filtering output signal $x_{2k}(t)$ are sampled according to a period of $T_b/N_s$ through the following formula:

$$\begin{cases} z_{1k}(i) = x_{1k}\left((k-1)T_b + \frac{T_b}{N_s}(i-1) + \frac{n_{samp}}{2} \Delta t\right) & 1 \le i \le N_s \\ z_{2k}(i) = x_{2k}\left((k-1)T_b + \frac{T_b}{N_s}(i-1) + \frac{n_{samp}}{2} \Delta t\right) & 1 \le i \le N_s \end{cases}, \tag{6}$$

wherein i is a positive integer, $z_{1k}(i)$ and $z_{2k}(i)$ are sampling sequences of the optimal SNR points after performing the chaotic matched filtering operation on the demodulated reference signal and the demodulated information bearing signal, $i=1, \ldots, N_s$;

step 8: determining polarity of each symbol to obtain a recovered signal;

wherein for the kth information bit, a discrete correlation is performed on $z_{1k}(i)$ and $z_{2k}(i)$ to obtain $z_k$, and the discrete correlation is calculated by the following formula:

$$Z_k = \sum_{i=1}^{N_t} z_{1k}(i) z_{2k}(i), \tag{7}$$

and the kth information bit is recovered according to the calculated result $z_k$ through the following formula to obtain the recovered signal:

$$\tilde{b}_k = \begin{cases} +1 & Z_k > 0 \\ -1 & Z_k \le 0 \end{cases}, \tag{8}$$

and communication is completed.

2. The communication method for phase separation DCSK based on the SOHS as claimed in claim 1, wherein at step 1, the bit transmission rate $R_b=1$ bit/s, the symbol period $T_b=1$s, the spreading gain $L=256$, $n_{samp}=64$, $T_c=0.25$s, $N_s=4$, and $f_c=10000$ Hz.

3. The communication method for phase separation DCSK based on the SOHS as claimed in claim 2, wherein at step 2, two symbols are transmitted and $B_n=\{+1 -1\}$.

4. The communication method for phase separation DCSK based on the SONS as claimed in claim 3, wherein at step 3, an initial value of u(t) is 0.842 and $f=1/(\Delta t \cdot n_{samp})=1/(T_b/L \cdot n_{samp})=4$ Hz.

* * * * *